Figure 1:
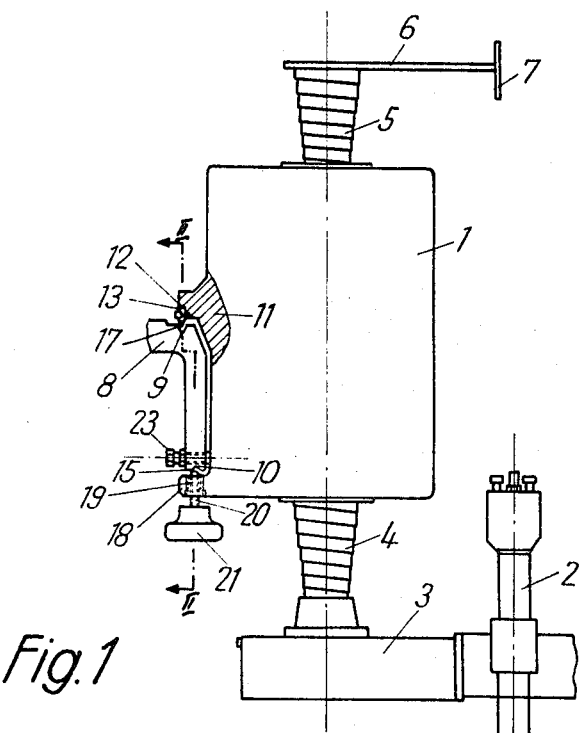

United States Patent Office 3,419,257
Patented Dec. 31, 1968

3,419,257
MOUNTING ARRANGEMENT FOR CUTTING TORCH OF OXYACETYLENE CUTTING MACHINE
Georg Röder, Frankfurt am Main-Fechenheim, Germany, assignor to Messer Griesheim G.m.b.H., Frankfurt am Main, Germany, a corporation of Germany
Filed Sept. 20, 1966, Ser. No. 580,726
7 Claims. (Cl. 266—23)

This invention relates to a detachable arrangement for mounting the vertically-adjustable cutting torch support and housing of an oxyacetylene cutting machine on its upper carriage, and it more particularly relates to such an arrangement whose angle of engagement is adjustable.

The upper carriage of an oxyacetylene cutting machine moves in two planar directions during its operation and carries the cutting torch along with it. The cutting torch is also independently vertically adjustable on its carriage or support. The means for adjusting the vertical position or elevation of the cutting torch must be enclosed, as must all working parts, to prevent them from being contaminated by dust and dirt in the surrounding atmosphere.

The means for adjusting the elevation of the cutting torch must be particularly well enclosed because considerable amounts of metal dust and ashes surround the cutting torch during its operation. The cutting torch is therefore well protected within a tight housing. This protective enclosure makes it difficult to obtain access to the torch elevation adjusting means from outside the housing. It is therefore advisable to detachably mount the housing for the vertically-adjustable cutting torch upon the upper carriage of the cutting machine to facilitate its detachment and replacement in the event of breakdown or other stoppage in operation. This provides ample time to work upon the relatively inaccessible torch adjusting means while it is removed from the cutting machine because the cutting machine can then be continuing its operation with a replacement torch housing mounted upon it.

Oxyacetylene cutting machines universally require movement of their cutting torches in exact correspondence with the pattern to which the machine is set. It is, therefore, necessary that the mounting for the torch housing positively and securely hold it in the position to which it is adjusted. The mounting arrangement should also be very simple and rugged for withstanding the rough demands to which it is subjected in the work performed by oxyacetylene cutting machines.

An object of this invention is to provide a simple and rugged arrangement for securely and adjustably mounting the cutting torch and housing of an oxyacetylene cutting machine upon its upper carriage which is readily adjustable and detachable.

In accordance with this invention the upper carriage of the oxyacetylene cutting machine includes an upwardly disposed groove and a downwardly disposed groove below and parallel thereto. A pair of downwardly disposed supporting elements are attached to the vertical rear wall of the torch housing at substantially the same level with each other. A vertically-adjustable projecting element is attached to the rear wall below and between the downwardly disposed supporting elements. The distance between the supporting and projecting elements is great enough to receive the grooves of the carriage between them. The housing is supported upon the upper groove at the two points provided by the upper supporting elements. The ultimate position of the upper supporting elements within the groove establishes the horizontal level of the cutting torch. Once this position is established, it cannot be altered by the effect of dirt or dust upon the engaging parts because dirt and other foreign matter is harmlessly thrust aside from between them because of great load imposed between the parts which are only in point contact with each other.

This also holds true for the angular position of the cutting torch attachment relative to its vertical axis. The angular engagement of the cutting torch with the carriage is determined by the position of the lower groove relative to the upper groove and by the engagement of the control element in the lower groove relative to the position of the upper supporting element in the upper groove. The aforementioned self-cleaning phenomenon applies to the engagement between the projecting element within the lower groove the same as for the upper supporting elements in the upper groove. This arrangement also permits the position of the cutting torch to be arranged relative to all three coordinate axes. The adjustable projecting element permits angular adjustment of the engagement of the housing relative to the upper carriage.

When the adjustable projecting element is completely disengaged from the lower groove upon the carriage, the cutting torch housing is solely supported by the engagement of the upper supporting elements in the upper groove. The weight of the cutting torch attachment, which is in some cases very heavy, is solely supported within the upper groove and it can then be removed from it. When a replacement cutting torch adjustment is installed, it is first supported by its upper supporting element within the upper groove. This supports the weight upon the upper carriage. The adjustable projecting element, which was previously withdrawn out of engagement, is then adjusted into contact with the lower groove to bring the cutting torch to its final angular position in which it is securely attached to the upper carriage.

The supporting and projecting elements have curved or hemispherical ends with radii slightly smaller than the depth of their grooves for securely entering into full engagement with them. The grooves have approximately right angular cross sections to firmly engage the supporting and projecting elements and to permit the degree of engagement of the projecting element in the lower groove to govern the angular engagement of the housing with the upper carriage and its ultimate angular position.

A particularly convenient and rugged adjustable projecting element is provided by a screw passing through a tapped lug extending from the rear wall of the housing. A knob is provided at the end of the screw remote from the carriage for manipulating it. This knob, in a particularly advantageous embodiment of this invention, is made readily accessible by aligning the lug with the bottom edge of the housing. This disposes the handle below the housing to make it readily accessible. In some instances the ultimate position defined by the engagement of the groove and supporting and projecting elements still requires a fine adjustment. For this purpose one or two adjustable screws are mounted within the carriage with their ends in contact with the housing wall. These adjusting screws may be operated while the projecting element is disengaged to preliminarily define the angular position of engagement of the housing with the carriage. The projecting element is then advanced and engaged into contact with the lower groove. The adjusting screws can then remain where they are or can be withdrawn when the housing is disposed in its ultimate position by engagement of the adjustable projecting element in the lower groove.

Figure 2:
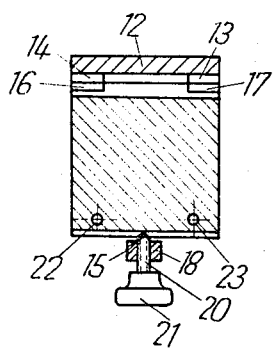

Novel features and advantages of the present invention will become apparent to one skilled in the art from a reading of the following description in conjunction with the accompanying drawings wherein similar reference characters refer to similar parts and in which:

FIG. 1 is a view in elevation partially broken away in cross section of one embodiment of this invention; and FIG. 2 is a cross-sectional view taken through FIG. 1 along the line II—II.

In FIG. 1 is shown housing 1 enclosing means for adjusting the elevation or height of cutting torch 2. Cutting torch 2 is mounted upon the outer end of bracket 3 attached to support 4 extending from housing 1. A bracket 6 for supporting hose lines 7 for the gas supply to torch 2 is attached to upper support 5 extending from housing 1.

Beam 8 incorporated in the upper carriage of the oxyacetylene cutting machine (otherwise not shown) is shown in FIGS. 1 and 2. Beam 8 includes an upwardly disposed groove 9 and a downwardly disposed groove 10 a distance below and parallel to groove 9. The rear wall 11 of housing 1 (which is partially broken away in cross section) is adjacent carriage beam 8 and extends substantially parallel and spaced from the plane including grooves 9 and 10. A projecting ledge 12 extends from rear wall 11 and two downwardly disposed supporting or bearing elements 13 and 14 extend downwardly from it at approximately the same level. Supporting or bearing elements 13 and 14 include curved or hemispherical bearing surfaces 16 and 17 which engage in groove 9.

Lug 18 is attached to rear wall 11 of housing 1 adjacent its lower end. Lug 18 is laterally disposed approximately in the center of rear wall 11 and includes a vertical tapped hole 19. Screw 20 is engaged within hole 19 and includes a knob 21 on the side of lug 18 remote from carriage 8. The end 15 of screw 20 is curved in a hemispherical shape to engage within groove 10. Ends 16 and 17 of the downwardly disposed supporting elements 13 and 14 and end 15 of adjustable projecting element or screw 20 are smaller than angular grooves 9 and 10 within which they engage for facilitating full engagement therein and the adjusting function performed by screw projecting element 20 later described in detail. The cross sections of grooves 9 and 10 are approximately right angular.

A pair of adjustable screw elements 22 and 23 are engaged within tapped holes in carriage 8 with their ends in engagement with rear wall 11 of carriage 8 and knobs accessible on the other side of carriage 8.

To prepare the cutting machine for operation, adjustable projecting screw 20 is turned upwardly into engagement within groove 10 for holding carriage 8 rigidly between supporting elements 13 and 14 and projecting screw 20. Engagement is released by withdrawing projecting screw 20 from engagement with groove 10 until housing 1 can be rotated counter-clockwise about an axis through supporting elements 13 and 14 as shown in FIG. 1. This permits housing 1 to be rotated and lifted out of engagement with carriage beam 8. Replacement and securing of a substitute housing is accomplished in the reverse order. Screw 20 of the replacement housing is withdrawn sufficiently to drop upper bearing elements 13 and 14 within upper groove 9, and the lower end of housing 1 including lug 18 is then rotated under groove 10. Knob 21 of projecting screw 20 is then rotated to engage curved end 15 of screw 20 within angular groove 10. The degree of engagement of end 15 within the inclined walls of groove 10 governs the angular position of housing 1. The considerable weight of housing 1 maintains end 15 firmly engaged in its set position within the outer wall of groove 10 as shown in FIG. 1.

Adjusting screws 22 and 23 facilitate the final adjustment of the angular position of housing 1 relative to beam 8. Screws 22 and 23 can first be screwed more or less within their corresponding holes in carriage beam 8 before or during the tightening engagement of screw 20. After screw 20 is finally set, adjusting screws 22 and 23 can be left where they are or withdrawn.

What is claimed is:

1. An adjustable arrangement for mounting a vertically-adjustable torch support and housing on the upper carriage of an oxyacetylene cutting machine, said arrangement comprising an upwardly disposed groove upon said upper carriage, a downwardly disposed groove upon said upper carriage below and substantially parallel to said upwardly disposed groove, a pair of downwardly disposed supporting elements upon a wall of said housing, said downwardly disposed supporting elements being arranged at substantially the same level for engagement in said upwardly disposed groove, an adjustable projecting element attached to said wall of said housing a distance below said downwardly disposed supporting elements sufficient to receive said grooves therebetween, and said adjustable projecting element having sufficient movement for receiving said upwardly and downwardly disposed grooves between said downwardly disposed supporting elements and said adjustable projecting element and for inserting said projecting element into said downwardly disposed groove to retain said housing upon said upper carriage in cooperation with said downwardly disposed elements engaged in said upper groove.

2. An arrangement as set forth in claim 1 wherein, said downwardly disposed supporting elements and said adjustable projecting elements have hemispherical surfaces with radii slightly smaller than the depth of said grooves for engaging therein, and said grooves have cross sections arranged approximately in a right angle form.

3. An arrangement as set forth in claim 1 wherein, said adjustable projecting element comprises a tapped lug extending from a lower portion of said wall of said housing, a screw engaged within said tapped lug, and a knob upon the end of said screw remote from said carriage for controlling the engagement of the end of said screw within said downwardly disposed groove of said carriage.

4. An arrangement as set forth in claim 3 wherein, said tapped lug is disposed at the bottom end of said housing whereby said knob is readily accessible for adjustment.

5. An arrangement as set forth in claim 1 wherein, an adjusting element is screwed within the lower end of said carriage with an end disposed in contact with said side wall whereby the angle of engagement of said housing with said carriage is finely adjusted.

6. An arrangement as set forth in claim 1 wherein, said grooves have angular cross sections, the ends of said downwardly disposed supporting elements and said projecting elements have curved surfaces for engaging said grooves, and said ends of said downwardly disposed supporting elements and said projecting elements are small enough to be received within said grooves whereby the amount of engagement of said projecting element within said downwardly disposed groove controls the angle of engagement of said housing with said upper carriage.

7. An arrangement as set forth in claim 6 wherein, said cross sections of said grooves are approximately right angular and said ends of said supporting and projecting elements are approximately hemispherical.

References Cited

UNITED STATES PATENTS 2,184,561   12/1939   Babcock et al.
3,331,597   7/1967   Best et al.

JOHN J. CAMBY, *Primary Examiner.*

PO-1050
(5/69)

UNITED STATES PATENT OFFICE
CERTIFICATE OF CORRECTION

Patent No. 3,419,257      Dated December 31, 1968

Inventor(s) Georg Roder

It is certified that error appears in the above-identified patent and that said Letters Patent are hereby corrected as shown below:

Column 1, in the heading after "Filed Sept. 20, 1966, Ser. No. 580,726" add the following line --- Claims priority application Germany, Sept. 24, 1965, M 66,754 ---

SIGNED AND
SEALED

OCT 21 1969

(SEAL)
Attest:

Edward M. Fletcher, Jr.
Attesting Officer

WILLIAM E. SCHUYLER, JR.
Commissioner of Patents